United States Patent [19]
Elelnrieder et al.

[11] Patent Number: 6,062,625
[45] Date of Patent: May 16, 2000

[54] VARIABLE ROOF BOX FOR A CONVERTIBLE

[75] Inventors: Guenther Elelnrieder, Olstfildern; Rainer Kristl, Wernau; Dieter Martens, Moenshiem; Oliver Wagner, Filderstadt, all of Germany

[73] Assignee: DaimlerChrysler AG, Stuttgart, Germany

[21] Appl. No.: 09/025,855

[22] Filed: Feb. 19, 1998

[30] Foreign Application Priority Data

Feb. 19, 1997 [DE] Germany .............................. 197 06 398

[51] Int. Cl.$^7$ ................................ B60N 2/36; B60J 7/08; B60J 7/20
[52] U.S. Cl. .............................. 296/66; 296/85; 296/108; 296/180.1
[58] Field of Search ............................. 296/37.16, 65.09, 296/65.17, 107.17, 108, 116, 136, 180.1, 85, 66

[56] References Cited

U.S. PATENT DOCUMENTS

| | | | |
|---|---|---|---|
| 2,750,227 | 6/1956 | Orr | 296/65 |
| 4,202,577 | 5/1980 | Breitschwerdt et al. | 296/24 R |
| 4,728,141 | 3/1988 | Motozawa et al. | 296/37.16 |
| 4,796,943 | 1/1989 | Fukutomi et al. | 296/65.1 |
| 4,854,634 | 8/1989 | Shiraishi et al. | 296/108 |
| 5,338,089 | 8/1994 | Gotz et al. | 296/180.5 |
| 5,785,375 | 7/1998 | Alexander et al. | 296/108 |

FOREIGN PATENT DOCUMENTS

| | | | |
|---|---|---|---|
| 230806 | 8/1987 | European Pat. Off. | 296/37.16 |
| 565430 | 10/1993 | European Pat. Off. | 296/37.16 |
| 2696982 | 4/1994 | France | 296/136 |
| 1 505 494 | 9/1969 | Germany . | |
| 195 14 785 | 9/1985 | Germany . | |
| 37 33 892 | 4/1989 | Germany . | |
| 3914036 | 4/1990 | Germany | 296/136 |
| 3909397 | 10/1990 | Germany | 296/37.16 |
| 40 37 705 | 10/1991 | Germany . | |
| 4018862 | 1/1992 | Germany | 296/85 |
| 40 38 873 | 4/1992 | Germany . | |
| 43 30 411 | 10/1994 | Germany . | |
| 44 38 190 | 11/1995 | Germany . | |
| 62-8818 | 1/1987 | Japan . | |
| 406270745 | 9/1994 | Japan | 296/136 |

*Primary Examiner*—B. Dayoan
*Assistant Examiner*—Paul Chenevert
*Attorney, Agent, or Firm*—Evenson, McKeown, Edwards & Lenahan, P.L.L.C.

[57] ABSTRACT

A hardtop for a convertible includes a front roof part and a rear roof part with a fixed rear window. The front and rear roof parts are operated by a lateral folding mechanism to be moved between a raised position and a retracted position in which the roof parts are contained in a roof box. The roof box is made variable in size via a foldable portion of the rear seat. When the roof is in the raised position, the foldable portion of the rear seat forms the rear seat. When the roof is retracted, the foldable portion of the rear seat is folded forward to enlarge the roof box. A shelf is attached to the foldable portion of the rear seat, which is an upper part of a backrest and is foldable about a horizontal axis of rotation to form a floor part of the roof box. The shelf forms a front wall of the roof box when the upper part of the backrest is folded. A roll bar is movable between a raised position and a lowered position. A roller shade box is disposed at a rear area of the shelf. The roller shade has a free end removably attached to the roll bar. When the roof parts are in a retracted position, the roller shade forms a wind screen when the roll bar is in a raised position, and the roller shade forms a cover for the roof parts when the roll bar is in a lowered position.

9 Claims, 3 Drawing Sheets

VARIABLE ROOF BOX FOR A CONVERTIBLE

BACKGROUND AND SUMMARY OF THE INVENTION

This application claims the priority of German patent document 197 06 398.5 filed Feb. 19, 1997, the disclosure of which is expressly incorporated by reference herein.

The invention relates to a variable roof box for a convertible.

German patent document 43 30 411 C1 discloses a roof box of this class.

However, a disadvantage of this roof box is the very great amount of space required by the folded roof in the trunk of the car.

Furthermore, a car with a folding roof is disclosed in German patent document 195 14 785 A1, in which the roof box, when the roof is in the closed state, forms a part of the rear seat.

Here again, however, the disadvantage is the great amount of space required by the folded roof parts.

Hardtops for convertibles and roof boxes for convertibles are known, for example, from German Offenlegungsschrift 1 505 494. Also, German patent document 40 38 873 relates to a convertible roof of sheet steel with a rear window of glass, wherein the top is divided into a front roof part and a rear roof part. When the car is to be driven with the top down, the two roof parts or top parts are stored in the trunk space of the car. The same applies to German patent document 37 33 892.

Japanese Utility Model publication 62-8818 shows a car with a front roof part and a rear roof part plus a fixed rear window, the roof parts being stored in a roof box.

In these known hardtop convertibles, it is again a disadvantage that the storage of the roof parts plus the folding mechanism corresponding thereto when the roof is retracted requires a considerable amount of trunk space.

Thus, there is a need for a variable roof box for a convertible in which the roof parts, when in the retracted state, i.e., in the open-top state of the car, do not require such a great amount of trunk space, while at the same time retaining the advantages of the use of the roof box as part of the back seat.

This and other needs have been met according to the present invention by providing a variable roof box for a convertible having a front roof part and a rear roof part with a fixed rear window, said front and rear roof parts being movable via a folding linkage between a raised position and a retracted position, the roof box being defined by a foldable portion of a rear seat which is forwardly foldable to enlarge the roof box to receive the front and rear roof parts in the retracted position, wherein the folding mechanism includes a lever having an end rotatably attached to a fixed point which is situated forward of levers of the folding mechanism in the direction of travel, such that when the roof parts are moved to the retracted position the rear roof part is folded down and shifted forward in the direction of travel.

This and other needs have been met according to the present invention by providing a hardtop for a convertible, comprising: a front roof part; a rear roof part hinged to the front roof part; and a folding linkage operatively connected to said front a rear roof parts such that said roof parts are movable between a raised position and a retracted position, said multi-bar linkage comprising: a first lever having a proximal end articulated about a first fixed point; a second lever having a proximal end articulated about a second fixed point; a coupling link rotatably connected to distal ends of the first and second levers, said distal end of the second lever being rotatably connected to said rear roof part; a third lever rotatably connected to said front roof part and to said distal end of the first lever; and a fourth lever having a proximal end articulated about a third fixed point and having a distal end rotatably connected to said rear roof part, said third fixed point being located forward of said first and second fixed points.

This and other needs have been met according to the present invention by providing a hardtop for a convertible, comprising: a front roof part; a rear roof part rotatably connected to the front roof part via a hinge; a folding linkage operatively connected to said front and rear roof parts such that said roof parts are movable between a raised position and a retracted position, wherein in said retracted position said rear roof part is folded underneath said front roof part in a clamshell configuration, with said hinge between the front and rear roof parts being located at a rear end of said clamshell configuration, and with a rearward end point of said rear roof part when in said retracted position being located at a front end of said clamshell configuration.

Providing a crank on the folding mechanism and the connection according to the invention of the crank to the fixed point in front of the levers of the folding mechanism on the one hand and the back roof part on the other permits shifting the rear roof part forward in the direction in which the car moves, ultimately resulting in a reduction of the space required for the folded roof parts in the trunk space.

When the hardtop is folded away it is true that the rear seat space of the car is not available, but the possibility basically exists for carrying persons in the rear seat area when the car is driven with the hardtop down.

Other objects, advantages and novel features of the present invention will become apparent from the following detailed description of the invention when considered in conjunction with the accompanying drawings.

DETAILED DESCRIPTION OF THE DRAWINGS

A car is provided with a bipartite roof, namely a front roof part 1 and a rear roof part 2 with a fixed rear window 3. Also, the car has a roll bar 4 which is turned slightly forward in FIG. 1.

Figure 1:
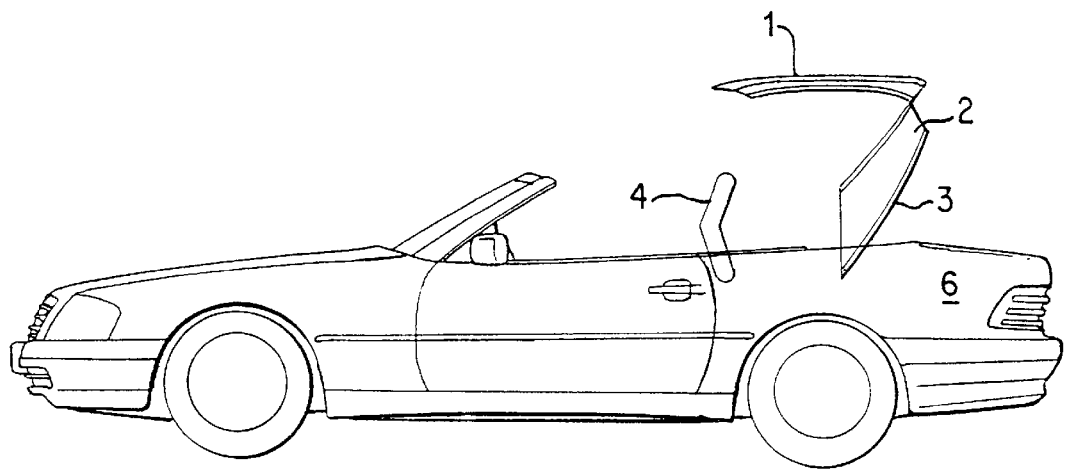
FIG. 1 is a side view of a vehicle with a hardtop in an intermediate position.
Figure 2:
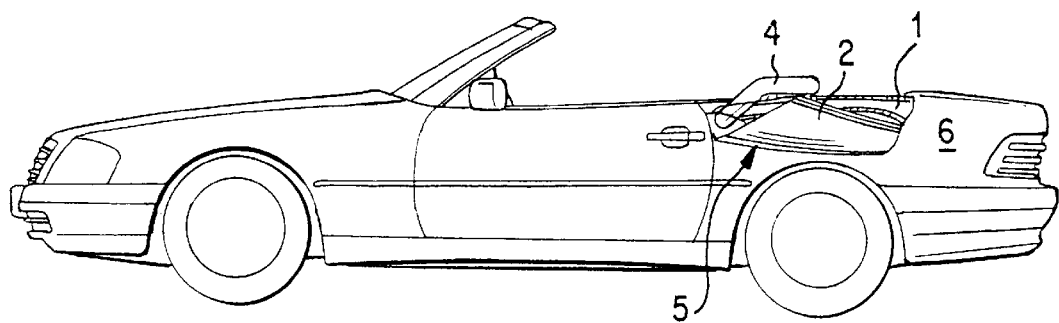
FIG. 2 shows the vehicle of FIG. 1 with the hardtop retracted in a roof box.

FIG. 2 shows the car of FIG. 1 with a front roof part 1 and rear roof part 2 deposited in a roof box, the roll bar 4 lying upon the retracted roof parts. As it can be seen, only a little more than half of the roof box 5 is in the space of the trunk compartment 6 of the car. The front part of the roof box 5 extends over a rear seat.

Figure 3:
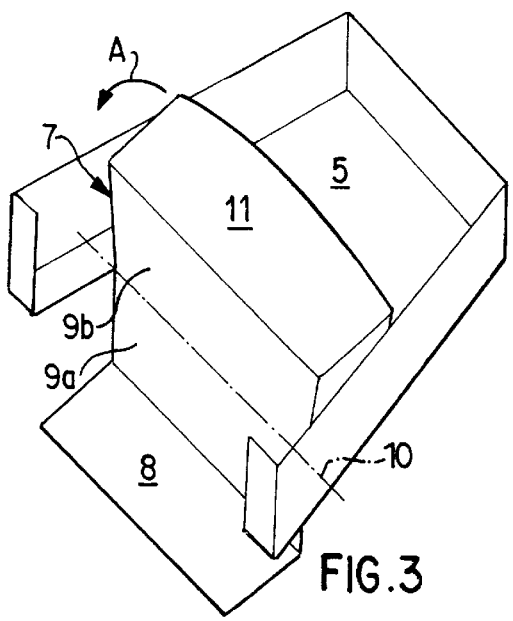
FIG. 3 is a schematic perspective view of the roof box with the hardtop closed and with a rear seat for passengers.
Figure 4:
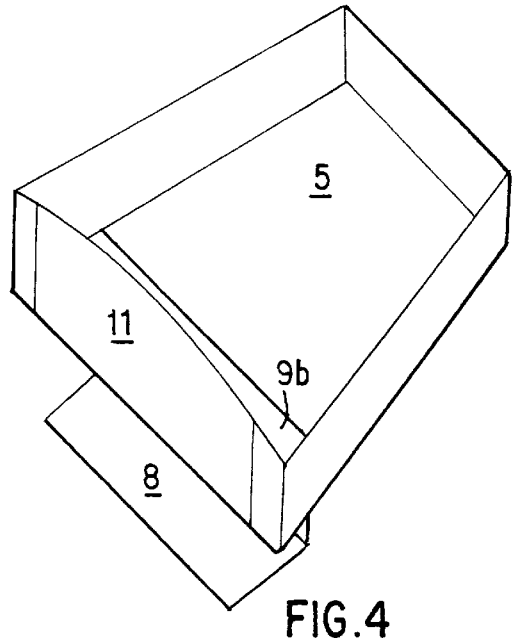
FIG. 4 shows the roof box of FIG. 3 in position ready to receive a hardtop with rear seats folded forward.

In FIGS. 3 and 4 the configuration of the roof box 5 is represented schematically. FIG. 3 shows the roof box 5 with the hardtop closed. As it can be seen, in this case a rear seat 7 is present or, if it is divided, two individual seats are present. The rear seat 7 has a seat 8 and a bipartite back rest 9a, 9b. The bipartite back rest 9a, 9b, has between the two parts a horizontal axis of rotation 10 running transversely of the length of the vehicle. The rear seat 7 is furthermore provided with a horizontal shelf 11 which can be configured as a hat shelf.

By turning the upper part 9b of the rear seat back rest in the direction of the arrow A in FIG. 3, the roof box 5 is significantly enlarged forwardly in the direction of travel.

FIG. 4 shows the full size of the roof box 5 as it is ready to receive the hardtop. As it can be seen, the hat shelf 11 which was formerly horizontal is now the vertical front wall of the roof box 5. The upper part 9b of the rear seat rest becomes the front area of the bottom of the roof box 5.

Figure 5:
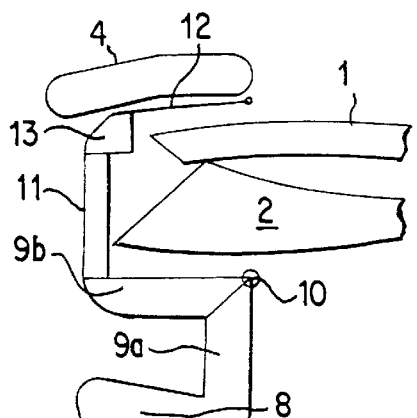
FIG. 5 is a schematic side view with a roller shade as a cover for retracted roof parts.
Figure 6:
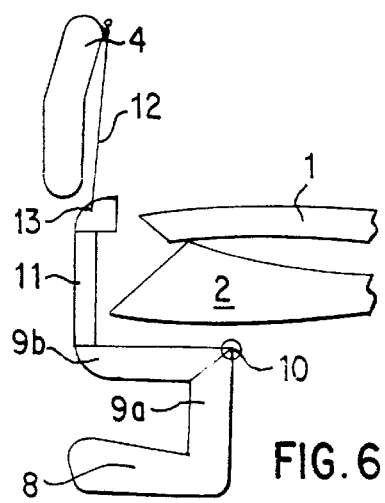
FIG. 6 is a side view of FIG. 5, with the roller shade as a wind screen with the hardtop retracted.
Figure 7:
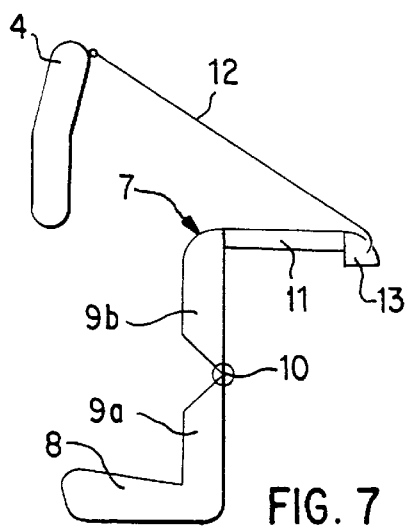
FIG. 7 is a side view corresponding to FIGS. 5 and 6 with a roller shade as a sunshade with the hardtop closed.

FIGS. 5 to 7 show different positions and uses for a roller shade 12 integrated into the structure. For this purpose a roller shade box 13 is fastened in the rear area at the rear end of the shelf 11. In the rolled-up state the roller shade 12 is in the roller shade box 13.

According to FIG. 5, the outer end of the roller shade 12 can be fastened to the upper (rear) part of the roll bar 4, which has been moved into a horizontal position. In the position according to this Figure, the roller shade 12 serves as a cover for the retracted roof parts, namely front roof part 1 and rear roof part 2.

FIG. 6 shows the roller shade 12 positioned as a wind screen. In this case the roll bar 4 is in a vertical or nearly vertical position, so that the roller shade 12 extends upward nearly vertically from the roller shade box 13.

FIG. 7 shows the roller shade positioned as a sunshade with the hardtop closed. At the same time it is also apparent from this figure that in this case the rear seat 7 is available for the accommodation of passengers.

The roller shade 12 can remain fastened to the roll bar 4 during movement between all three of the positions referred to above. This signifies that, in order to set up the different roller shade functions, it is necessary only to operate the roll bar.

If none of the three roller shade functions are desired, or a particular function is not desired, the roller shade 12 can be detached from the roll bar 4. It is then retracted by an automatic roll-up mechanism into the roller shade box 13 and stowed away therein.

Figure 8:
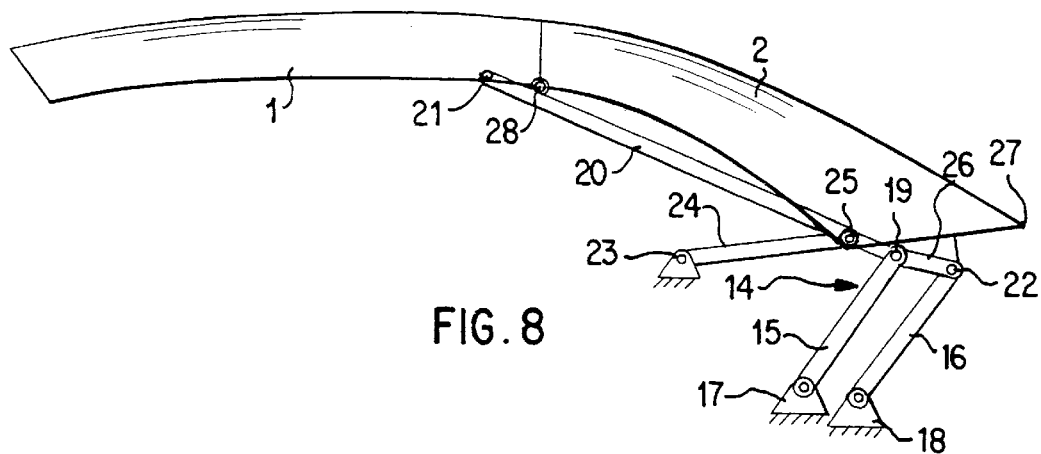
FIG. 8 is a schematic side view of the mechanism for lowering the hardtop in the starting position.
Figure 9:
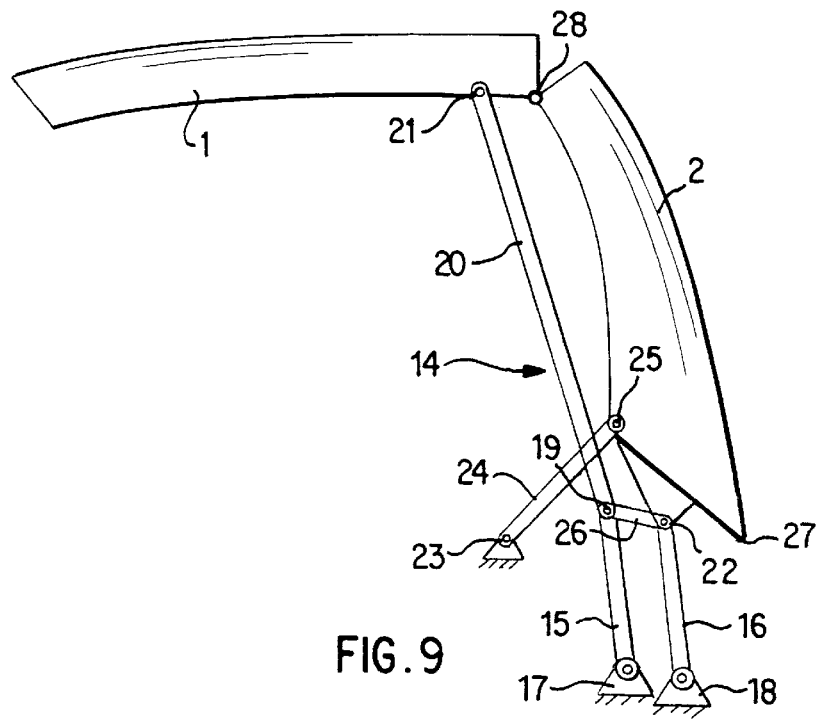
FIG. 9 is a schematic side view of the mechanism for retracting the hardtop in an intermediate position.
Figure 10:
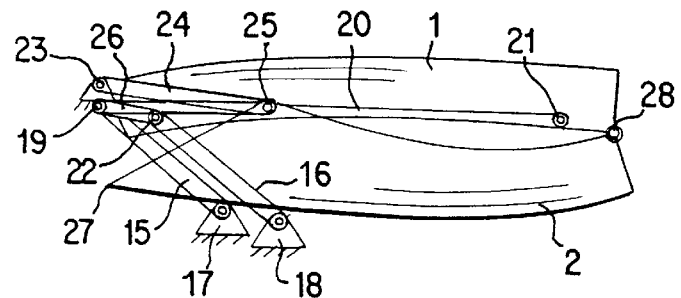
FIG. 10 is a schematic side view of the mechanism for retracting the hardtop in the retracted position.

FIGS. 8 to 10 schematically show the mechanism for the erection or retraction of the two roof parts, including lateral folding linkages 14. The folding linkages 14 have each two levers 15 and 16, each being connected at one of their two ends to a fixed point 17 and 18, respectively. The other end of lever 15 is attached at a joint 19 to one end of a lever 20 whose other end is connected by a joint 21 to the front roof part 1. The other end of the lever 16 is connected by a joint 22 to the lower part of the rear roof part 2.

Slightly above and in front of the two fixed points 17 and 18 in the forward driving direction, there is an additional fixed point 23 on the vehicle itself, and one end of a lever 24 is articulated to it. The other end of the lever 24 engages an additional joint 25 on the rear roof part 2, slightly above and forward of joint 22. The two joints 19 and 22 are connected to one another by a coupling link 26 situated between them.

The above-described configuration of the folding linkage 14 results in a mechanism which, while the front roof part 1 and rear roof part 2 are being laid away, causes the two parts to perform a longitudinal displacement forwardly in the direction of travel. This is brought about by the lever 24 in combination with the other levers. Practically, the folding linkage 14 is a parallelogram defined by the coupling link 26, the levers 15, 16, and a line between fixed points 17 and 18. In accordance with the motion of this mechanism with the lever 24, the joint 25 moves on a circular path around the fixed point 23, and during the lowering motion of the two roof parts the latter are brought forward by a considerable amount. This is apparent especially from the three positions of a rearward end point 27 of the rear roof part 2 compared with FIGS. 9 and 10. Front roof part 1 and rear roof part 2, which are joined together by a hinge 28, can in this manner come to rest compactly—in regard to the trunk compartment—in a clamshell-like manner in the roof box 5.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Variable roof box and hardtop for a convertible having a front roof part and a rear roof part with a fixed rear window, said front and rear roof parts being movable via a folding linkage between a raised position and a retracted position, the roof box comprising a foldable portion of a rear seat which is forwardly foldable to enlarge the roof box which can receive the front and rear roof parts in the retracted position, wherein the folding linkage includes one lever having an end rotatably attached to a fixed point which is situated forward of other levers of the folding linkage in the direction of travel, such that when the roof parts are moved to the retracted position the rear roof part is folded down and shifted forward in the direction of travel;

a shelf attached to said foldable portion of the rear seat, said foldable portion of the rear seat being an upper part of a backrest and being foldable about a horizontal axis of rotation to form a floor part of the roof box, said shelf forming a front wall of the roof box when said upper part of the backrest is folded;

a roll bar; and a roller shade box disposed at a rear area of the shelf, a roller shade having a free end removably attached to the roll bar, wherein the roll bar is movable between a raised position and a lowered position, and when the roof parts are in the retracted position the roller shade forms a wind screen when the roll bar is in the raised position and the roller shade forms a cover for the roof parts when the roll bar is in the lowered position.

2. Variable roof box according to claim 1, wherein the roller shade forms a sunshade when the roof parts are in the raised position.

3. Variable roof box according to claim 1, wherein the shelf is configured as a hat shelf.

4. A hardtop for a convertible, comprising:

a front roof part;

a rear roof part hinged to the front roof part; and a folding linkage operatively connected to said front a rear roof parts such that said roof parts are movable between a raised position and a retracted position, said multi-bar linkage comprising:

a first lever having a proximal end articulated about a first fixed point;

a second lever having a proximal end articulated about a second fixed point;

a coupling link rotatably connected to distal ends of the first and second levers, said distal end of the second lever being rotatably connected to said rear roof part;

a third lever rotatably connected to said front roof part and to said distal end of the first lever; and a fourth lever having a proximal end articulated about a third fixed point and having a distal end rotatably connected to said rear roof part, said third fixed point being located forward of said first and second fixed points.

5. A hardtop according to claim 4, wherein said first and second levers, said coupling link, and a line between said first and second fixed points define a parallelogram.

6. A hardtop according to claim 4, wherein in said retracted position said rear roof part is folded underneath said front roof part in a clamshell configuration, with a hinge point between the front and rear roof parts being located at a rear end of said clamshell configuration, and with a rearward end point of said rear roof part when in said raised position being located at a front end of said clamshell configuration.

7. A hardtop according to claim 4, wherein said front and rear roof parts have interior surfaces which face a passenger compartment of the convertible in the raised position, said interior surfaces of the front and rear roof parts facing each other in the retracted position.

8. A hardtop according to claim 4, wherein in said retracted position the roof parts are located at least partially above a rear seat of the convertible.

9. A hardtop according to claim 8, wherein at least a portion of a backrest of said rear seat is foldable forward to define a roof box for receiving said roof parts in said retracted position.

* * * * *